Sept. 6, 1960 J. MATARESE 2,951,970

ELECTROLUMINESCENT DEVICE

Filed March 25, 1957

INVENTOR
JOHN MATARESE
BY
ATTORNEY 2,951,970

Patented Sept. 6, 1960

2,951,970

ELECTROLUMINESCENT DEVICE

John Matarese, Bronx, N.Y., assignor, by mesne assignments, to Sylvania Electric Products Inc., Wilmington, Del., a corporation of Delaware Filed Mar. 25, 1957, Ser. No. 648,033

10 Claims. (Cl. 315—169)

My invention is directed toward electroluminescent image display devices.

Certain types of phosphors, when under the influence of an externally applied electric field, will luminesce, the intensity of the emitted light being some function of the strength of this applied field. Consequently, films, or layers formed from such phosphors can be used as transducers for transforming electrical energy to light energy. Phosphors of this type are said to be electroluminescent.

It is known that first and second mutually orthogonal (for example, horizontal and vertical) arrays of parallel, separated, electrical conductors can be positioned on each side of such a film or layer to form a crossed-grid structure wherein a portion of the film (defined as a cell) is connected between one horizontal conductor and one vertical conductor. When a suitable electric potential difference is applied between any one horizontal-vertical conductor pair, the cell connected between this pair will luminesce.

Further, it has been proposed to switch or commutate these applied potentials in such manner as to successively energize each cell in turn, thus producing an effect analogous to the cathode ray tube scanning operation as developed in a conventional television receiver.

It is an object of the present invention to improve apparatus applying switching or commutating potentials to a crossed-grid structure.

Another object is to utilize a rectifier matrix in applying switching or commutating potentials to a crossed-grid structure.

Still another object is to provide new and improved switching or commutating apparatus which utilize a first plurality of electric devices having two mutually exclusive electric states and a second plurality of rectifiers.

These and other objects of my invention will either be explained or will become apparent hereinafter.

In accordance with the principles of my invention, there is provided a crossed-grid electroluminescent structure having first and second separated arrays of parallel, separated, electrical conductors, the first array conductors being oriented at an angle other than zero with respect to the second array conductors. First rectifying and switching means, coupled between the first array conductors and first and second terminals, connect any selected first array conductor to the first terminal, and connect all unselected first array conductors to the second terminal.

Similarly, second rectifying and switching means, coupled between the second array conductors and said second and a third terminal, connect any selected second array conductor to the third terminal, and connect all unselected second array conductors to the second terminal.

Each of the first and second means can respond to successive pulses in corresponding first and second pulse trains to connect each conductor in the corresponding array in turn to the corresponding first or third terminal in a predetermined sequence while simultaneously connecting all unselected conductors in the corresponding array to the second terminal.

When each of the first, second and third terminals is maintained at a different potential, the potential difference between the first and third terminals being relatively large and the potential difference between the second terminal and either one of said first and third terminals being relatively small, each electroluminescent cell will be successively energized to the same degree.

Alternatively, a first signal as, for example, a video type signal can be applied between the first and second terminals and a second signal opposed in polarity to the first signal but otherwise identical thereto can be applied between the second and third terminals. In this situation, each electroluminescent cell will be successively energized as before, but the degree of luminescence of each enerized cell will depend upon the value of the signals applied across the enerized cell.

Illustrative embodiments of my invention will now be described with reference to the accompanying drawings, wherein Fig. 1 shows a conventional crossed-grid structure;

Figures 1, 2, 3:
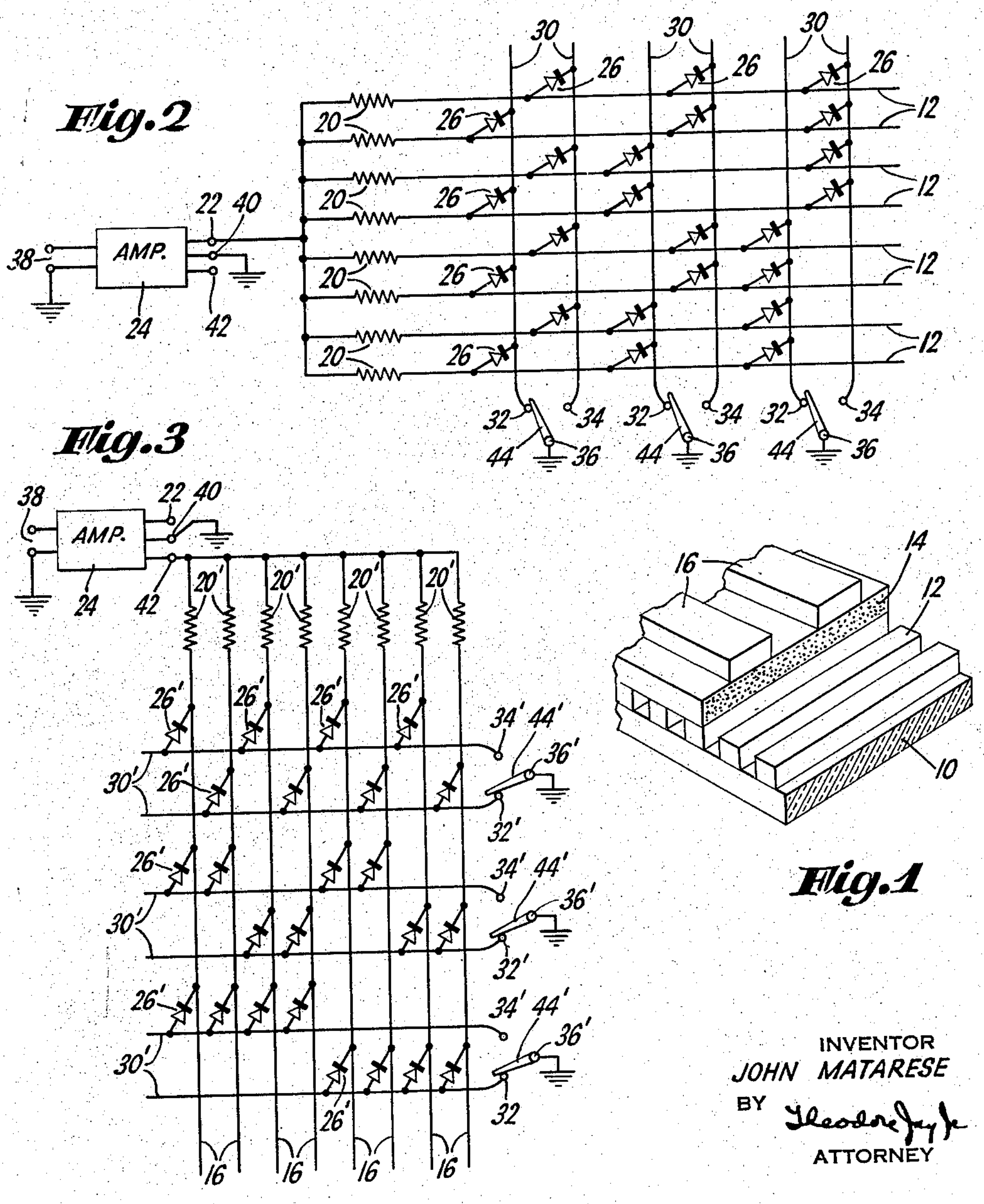
Fig. 2 is a circuit diagram of apparatus for applying switching signals to the horizontal array conductors of the structure of Fig. 1.
Fig. 3 is a circuit diagram of apparatus for applying switching signals to the vertical array conductors of the structure of Fig. 1.

Referring now to the drawings, Fig. 1 shows a known crossed-grid structure comprising a glass plate 10, a first array of horizontal, transparent electrical conductors 12, an electroluminescent layer 14, and a second array of vertical electrical conductors 16.

As shown in Fig. 2, there are $2^n$ conductors 12 in the first array where, in this example, $n$ is equal to 3. Corresponding ends of each conductor 12 are connected through corresponding resistors 20 to terminal 22 of a paraphase amplifier 24. The other end of each conductor 12 is connected through a different set of three rectifiers 26 to a different set of three vertical leads 30.

There are a total of six leads 30, each lead 30 being connected to a corresponding one of terminals 32 or 34 of one of three double pole single throw switches 36. The arms 44 of all these switches are grounded.

An incoming view type signal is applied between the input terminals 38 of the paraphase amplifier which then yields first and second amplified output signals opposed in polarity but otherwise identical across terminals 22, 40 and 40, 42, respectively.

Since each switch arm 44 is independently actuated, it will be apparent that for any given arrangement of switch positions of switches 36, the potential of a corresponding one of horizontal conductors 12 will be equal to that appearing on terminal 22, while all other horizontal conductors will be grounded through one or more rectifiers 26.

As is shown in Fig. 3, there are $2^m$ conductors 16 in the second array where, in this example, $m$ is also equal to 3. These conductors are resistively coupled to terminal 42 of amplifier 24 and are also connected through rectifiers 26' and leads 28' to switches 36' in the same manner as in Fig. 2.

It will be apparent that for any given arrangement of switches 36', the potential of a corresponding one of vertical conductors 16 will be equal to that appearing on terminal 42, while all other vertical conductors will be grounded through one or more rectifiers 26'.

As a result, the portion of the electroluminescent layer 14 about the cross over point between the selected vertical and horizontal conductors will luminescence to an extent dependent upon the amplified output signals.

Further, when the positions of the various switches 36 and 36' are sequentially changed, it will be apparent that the desired switching or commutating action will ensue.

The switch arm positions can be changed mechanically. However, a more rapid switching action can be obtained by replacing each set of switches 36 and 36' by a cascaded binary sequence counter of conventional type, as, for example, a three stage counter, each stage being a flip-flop incorporating a two element or dual tube, such as a dual triode. In this case, each counter will respond sequentially to sequential pulses in an incoming pulse train. When any tube element is non-conducting, its plate voltage will be relatively high; conversely, when this element is conducting, its plate voltage will be relatively low and can approach ground potential.

Figure 4:
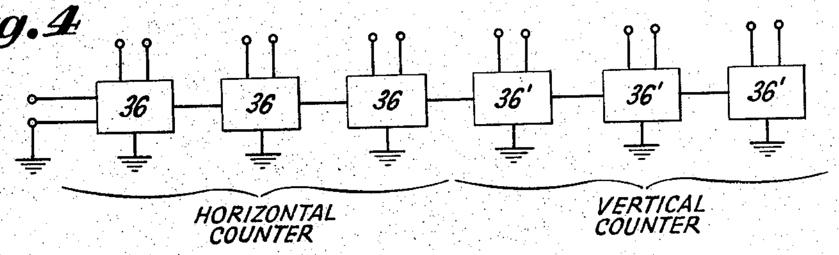
Fig. 4 is a block diagram of apparatus which can replace the two position switches of Figs. 2 and 3.

To avoid the use of separate impulse trains for the horizontal and vertical counters, the two sets of counters can be connected together in the manner shown in Fig. 4. In this figure, only one pulse train is used, the first stage 36 of the horizontal counter changing its conductive condition with each pulse and the first stage 36' of the vertical counter changing at conductive condition every eighth pulse in the manner previously indicated.

If desired, the switching action can be carried out in the absence of an applied video signal as, for example, applying a high positive potential to terminal 22 of Figs. 2 and 3 and applying a high negative potential to terminal 42 of Fig. 2 and Fig. 3. In this situation, each cross over point when energized will luminesce to an extent dependent upon the fixed potential difference between terminals 22 and 42.

There are various types of crossed-grid structures other than that shown in Fig. 1. For example, one type of crossed-grid structure incorporating an electroluminescent layer and a photoconductor layer is disclosed in the copending patent application of G. Rothschield, Serial No. 619,729, filed November 1, 1956, now Patent No. 2,915,641, and a second type of such a structure is disclosed in the copending patent application of D. Livingston, Serial No. 595,297, filed July 2, 1956, now Patent No. 2,874,308. It will be understood that my invention can be used with these and other types of crossed-grid structures as well as the structure of Fig. 1.

While I have shown and pointed out my invention as applied above, it will be apparent to those skilled in the art that many modifications can be made within the scope and sphere of my invention as defined in the claims which follow.

What is claimed is:

1. A device comprising a crossed-grid structure provided with first and second separated arrays of parallel, separated, electrical conductors, the first array conductors being orientated at an angle other than 0° with respect to the second array conductors; first, second, and third terminals; first rectifying and switching means coupled between said first array conductors and said first and second terminals to connect any selected first array conductor to said first terminal and to connect all unselected first array conductors to said second terminal; and second rectifying and switching means coupled between said second array conductors and said second and third terminals to connect any selected second array conductor to said third terminal and to connect all unselected second array conductors to said second terminal.

2. A device as set forth in claim 1 further including means to apply a first signal between said first and second terminals and a second signal opposed in polarity to said first signal but otherwise identical between said second and third terminals.

3. A device as set forth in claim 1 wherein each of said first, second and third terminals is maintained at a different potential, the potential difference between the first and third terminals being relatively large, the potential difference between said second terminal and either one of said first and third terminals being relatively small.

4. An electroluminescent device comprising a crossed-grid structure provided with first and second separated arrays of parallel, separated, electrical conductors, and an electroluminescent layer interposed between and electrically coupled to said arrays, the first array conductors being oriented at an angle other than 0 with respect to the second array conductors; first, second, and third terminals; first rectifying and switching means coupled between said first array conductors and said first and second terminals to connect each first array conductor in turn to said first terminal in a predetermined sequence and, simultaneously, to connect all unselected first array conductors to said second terminal; and second rectifying and switching means coupled between said second array conductors and said second and third terminals to connect each second array conductor in turn to said third terminal in a predetermined sequence and, simultaneously, to connect all unselected second array conductors to said second terminal.

5. An electroluminescent device comprising a crossed-grid structure provided with first and second separated arrays of parallel, separated, electrical conductors, and an electroluminescent layer interposed between and electrically coupled to said arrays, the first array conductors being oriented at an angle other than 0 with respect to the second array conductors; first, second, and third terminals; first rectifying and switching means coupled between said first array conductors and said first and second terminals and responsive to successive pulses in a first pulse train to successively connect each first array conductor in turn to said first terminal in a predetermined sequence and, simultaneously, to connect all unselected first array conductors to said second terminal; and second rectifying and switching means coupled between said second array conductors and said second and third terminals and responsive to successive pulses in a second train to successively connect each second array conductor in turn to said third terminal in a predetermined sequence and, simultaneously, to connect all unselected second array conductors to said second terminal.

6. A device as set forth in claim 5 further including means to apply a relatively high constant voltage between said first and third terminals and to apply relatively low constant voltages between said second terminal and each of said first and third terminals.

7. A device as set forth in claim 5 further including means to apply a first video type signal between said first and second terminals and to apply a second video type signal opposed in polarity to said first signal but otherwise identical thereto between said second and third terminals.

8. In combination, a $(2^n+2^m)$ plurality of separate, electrical conductors segregated into a first array of $2^n$ conductors and a second array of $2^m$ conductors where $n$ and $m$ are positive integers; a $(n+m)$ plurality of devices having two mutually exclusive electric states, each device having first, second and third terminals and, depending upon its state, connecting its first terminal to a selected one of its second and third terminals, said devices being segregated into a first group of $n$ devices and a second group of $m$ devices, all of said first terminals being interconnected; a $(n2^n+m2^m)$ plurality of rectifiers; a $2(n+m)$ plurality of electrical conductor leads segregated into a first collection of $2n$ leads and a second collection of $2m$ leads, each first collection lead being connected to a corresponding one of the second and third terminals in said first device group, each second collection lead being connected to a corresponding one of the second and third terminals in said second device group; each first array conductor being respectively connected through a different selection of $n$ rectifiers to a different selection of $n$ first collection leads, each second array conductor being respectively connected through a different selection of $m$ rectifiers to a different selection of $m$ second collection leads.

9. The combination as set forth in claim 8 wherein said interconnected first terminals are connected to a first potential point and further including means to couple corresponding ends of said first array conductors to a second potential point and to couple corresponding ends of said second array conductors to a third potential point, the potential difference between said first and third points being relatively large and the potential difference between said second point and each of said first and third points being relatively low.

10. The combination as set forth in claim 8 further including means to apply a first signal between one end of each of said first array conductors and said interconnected first terminals and to apply a second signal opposed in polarity to said first signal but otherwise identical thereto between one end of each of said second array conductors and said interconnected first terminals.

References Cited in the file of this patent

UNITED STATES PATENTS

| | | |
|---|---|---|
| 2,136,441 | Karolus | Nov. 15, 1938 |
| 2,201,066 | Toulon | May 14, 1940 |
| 2,670,402 | Marks | Feb. 23, 1954 |
| 2,698,915 | Piper | Jan. 4, 1955 |
| 2,749,480 | Ruderfer | June 5, 1956 |
| 2,774,813 | Livingston | Dec. 18, 1956 |
| 2,818,531 | Peek | Dec. 21, 1957 |